United States Patent
Pied

[15] 3,676,395
[45] July 11, 1972

[54] STABILIZERS FOR POLYSULPHIDES

[72] Inventor: Jean-Philippe Pied, Bully-Les-Mines, France

[73] Assignee: Societe Ethylene Plastique, Paris, France

[22] Filed: March 11, 1970

[21] Appl. No.: 18,707

[30] Foreign Application Priority Data

March 12, 1969 France.....................................6907016

[52] U.S. Cl. ..................260/45.9 R, 260/45.7 P, 260/79, 260/838
[51] Int. Cl. ...................................C08g 51/58, C08g 51/60
[58] Field of Search..................260/45.7 P, 45.9 R, 51.5, 79, 260/570.9, 838

[56] References Cited

UNITED STATES PATENTS

| | | | |
|---|---|---|---|
| 3,519,598 | 7/1970 | Larsen | 260/45.75 |
| 3,380,961 | 4/1968 | Dressler et al. | 260/45.9 |
| 3,522,205 | 7/1970 | Gobran et al. | 260/45.9 |
| 3,506,614 | 4/1970 | Chen et al. | 260/67 |
| 3,461,172 | 8/1969 | Previc | 260/621 |
| 3,436,373 | 4/1969 | Cox et al. | 260/51.5 |
| 3,489,702 | 1/1970 | Abramoff | 260/18 |
| 3,582,521 | 6/1971 | Villa | 260/45.75 |

*Primary Examiner*—Donald E. Czaja
*Assistant Examiner*—R. A. White
*Attorney*—Schellin and Hoffman

[57] ABSTRACT

A method of stabilizing polylalkane sulphides) when heated, characterized in that the following substance is added to the polymer: from 0.5 to 10 percent by weight, with respect to the polymer, of a Mannich base or of a condensation product of a Mannich base and an aldehyde and, if required, a product chosen from among the acrylamides, the diisocyanates and the epoxides.

16 Claims, No Drawings

STABILIZERS FOR POLYSULPHIDES

The invention relates to novel stabilizers for poly(alkene sulphides).

It is known, in a very general manner, that poly(alkene sulphides) can be thermally stabilized by the addition of nitrogenous compounds such as amides, amines, substituted amines, polyamines or compounds containing nitrogen in a ring structure. The efficiency, however, of these different compounds may vary considerably with the structure of the products used and with the thermal conditions to which the polysulphides are exposed. Some substances, such as acrylamide, are inactive or may even have an adverse effect.

The applicants have discovered a new class of compounds which, when used alone or in synergetic combination with other products, are very effective in thermally stabilizing poly(alkene sulphides).

The poly(alkene sulphides) which can be stabilized according to the invention are known products, i.e. polythiirane or polythioethene or poly(ethylene sulphide), a crystalline polymer having a melting point higher than 200° C, isotactic or atactic poly(propylene sulphide) or polymethyl thiirane, or thiirane and methyl thiirane copolymers, which are crystalline or amorphous depending on the proportions of comonomers. These polymers are of importance in industry, either as plastics or elastomers. The polymers have a high molecular weight, above 10,000, and are obtained by anionic polymerization.

The stabilizers according to the invention are Mannich bases obtained by a reaction between a compound containing at least one phenol group and an amine and an aldehyde, preferably formaldehyde. The stabilizers according to the invention are resinous products obtained by a reaction between aldehydes, preferably formaldehyde, and at least one of the aforementioned Mannich bases.

The Mannich bases used as stabilizers according to the invention are obtained by the reaction of an aldehyde and an amine with a phenol. The reaction is the following type:

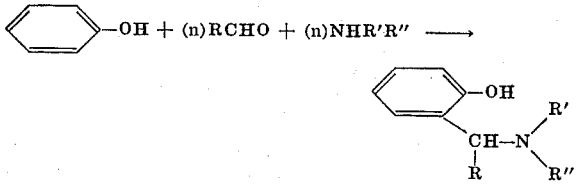

in which $n = 1, 2$ or $3$.

A number of aldehyde and amine molecules can be made to react with each phenol molecule. For example, tridimethyl aminomethyl phenol (TDMP) is obtained by the reaction three aldehyde molecules and three dimethylamine molecules with one phenol molecule.

The phenols used can be mono- or polyphenols or phenols in which the different hydrogen atoms in the ring can be replaced by aliphatic or alcoholic groups. The substances which can be used include phenol, cresols, xylenols, polyphenols such as diphenol A, 2,2'-dihydroxy-diphenyl methane, 4,4'-dihydroxy-diphenyl methane, ortho- and para-hydroxybenzyl alcohols and polyhydroxymethyl phenols.

The aldehydes which can be used include formaldehyde, acetaldehyde, benzaldehyde, acrolein and fur-furaldehyde.

The amines which can be used include the mono- and dialkylamines, more particularly monomethyl, dimethyl and ethylamines, piperazine and morpholine.

In all the products according to the invention it appears that the presence of a phenol group in the ortho- and para-position with respect to the substituent amino group has a kind of internal synergetic effect with respect to the stabilizing properties of the aforementioned products. Consequently, the corresponding non-aminated phenol compounds do not have stabilizing properties, or have them to a greatly reduced extent. Similarly, the corresponding amino compounds which do not contain a phenol group have greatly inferior stabilizing properties.

The aforementioned Mannich bases can be condensed on aldehydes to give resinous products which have at least twice the molecular weight of the initial base and which are excellent thermal stabilizers for polysulphides.

Furthermore, the stabilizers according to the invention can advantageously be used in synergy with other compounds selected from among the acrylamides, the diisocyanates, the mono- or diepoxides and the triaryl or trialkyl phosphines, the aforementioned aldehydes, the ortho- and para-hydroxybenzyl alcohols and the polyhydroxymethyl phenols.

The acrylamides used have the general formula:

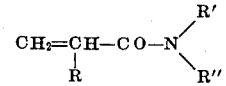

where $R = H$, $CH_3$, $C_2H_5$ and $R'$ and $R''$ can be e.g. H, $CH_3$, $C_2H_5$ or $CH_2OH$.

More particularly, the acrylamides can be NN-dimethyl and diethyl acrylamide, methacryl amide, and methylol acrylamide.

The diisocyanates used are more particularly 2,4-toluene diisocyanate, the phenylene diisocyanates, 4,4'-diphenylene diisocyanate, 1,5-naphthalene diisocyanate and the polymethylene diisocyanates.

The mono-epoxides and di-epoxides are more particularly a glycidic ester of versatic acid (Cardura E., manufactured by Shell), epikote resins, alkyl and phenylglycidic ethers, epoxyketones, butylene oxides, glycidic ethers of diphenols, and glycidic phthalates, maleates, oxalates and sebacates.

The following substances are particularly preferred: 2,2-bis [para(2,3-epoxy-propyloxy) phenyl] propane, para-bis-(2,3-epoxypropyloxy)-benzene and bis-(2,3-epoxypropyl) butylamine.

The phosphine used can be e.g. triphenyl phosphine.

In the latter case also, a synergetic effect is observed between the two constituents used as polysulphide stabilizers, in that the stabilizing effect of the mixture is greater than the sum of the stabilizing effects of each constituent, when used in the same proportions.

The Mannich bases or the condensation products of the Mannich bases with aldehydes are used in the proportion of 0.5 to 10 percent by weight and preferably 1 to 5 percent by weight, with respect to the polymer to be stabilized.

The other compounds mixed with the Mannich bases or the condensation derivatives of the Mannich bases with aldehydes are used in the following proportions.

0.5 to 10 percent and preferably 1 to 5 percent by weight with respect to the polymer to be stabilized, in the case of acrylamides, diisocyanates, mono- and diepoxides, aldehydes, ortho- and parahydroxybenzyl alcohols, and polyhydroxymethyl phenols, and 0.001 to 1 percent and preferably 0.01 to 0.1 percent by weight with respect to the stabilized polymer, in the case of triaryl or trialkyl phosphines.

It has also been found that the effectiveness of the stabilizers according to the invention may vary according to the method by which the polymer is prepared and according to the polymerization conditions. The nature of the medium and of the catalyst are particularly important. It has thus been found that, in the case of polysulphides prepared with metal and organometallic catalysts such as metal oxides, alkyls and carboxylates, the increases in stability obtained by using the stabilizing agents according to the invention were less than the increases obtained with polymers prepared by using the following catalysts: amines, tertiary phosphines, or quaternary ammonium and phosphonium carboxylates containing alkyl or aryl radicals.

The stabilizers according to the invention, when in solid form, are ground and mixed with the powdered polymer in conventional powder mixers. When in liquid or paste form, the stabilizers are dissolved in solvents, more particularly methanol. They are made into a paste with the polysulphide and the solution of stabilizer, and the solvent is evaporated by known methods. During industrial operation, in the latter case, the liquid or molten stabilizer is preferably introduced directly into a turbine mixer, e.g. a Henschell mixer, containing the powdered polymer, so that there is no need to evaporate the solvent.

The stability of the poly(alkene sulphides) when heated is measured in the following manner. A plastometer is used, such as described in the ASTM Standard D 1238 57T, but the operation is performed at 215° or 230° C, depending on the particular case. The polysulphide, with or without stabilizer, is first compacted in a cylinder whose diameter is slightly less than the diameter of the plastometer chamber. 4 grams of polysulphide are then introduced into the plastometer, and its outlet is stoppered. A 5 kg. weight is then placed above the plastometer piston. After 2 minutes, the 5 kg. weight is replaced by a 2.16 kg. weight, and after 15 seconds, the stopper is withdrawn and the amounts of the sample which flow through the orifice during each 2-minute period are collected separately and weighed to the nearest milligram. The fluidity index corresponds to the weight of substance, expressed in grams, which flows away in 10 minutes.

In the case of most of the products studied here, it is found that the weight of the different fractions increases abruptly at a particular moment which we have called the "stability time" or "stability." In the case, however, of some very stable products, the extrusion process has finished before the end of the stability stage has been observed.

In the case of a particular resin, the total extrusion time increases with stability and may be used to give an approximate value thereof.

The following non-limitative examples illustrate the invention:

Preparation of the Stabilizers According to the Invention

The method of preparing Mannich bases is well known. Depending on the particular case, the Mannich base is separated after formation from the reaction medium and purified, or the total reaction product is used in its crude form.

EXAMPLE 1.

Preparation of di-(diethyl aminomethyl phenol) (short name: DDEP)

9.4 grams of phenol (0.1 mol) and 29.2 grams (0.4 mol) of diethylamine in solution in 45 cm$^3$ of water were introduced into a 500 cm$^3$ flask equipped with an agitator, a condenser, a thermometer sheath and a funnel, and kept in a nitrogen atmosphere. 35 grams (0.35 mol) of a (30 percent) solution of formaldehyde were then added during half an hour. An exothermic reaction occurred. The temperature was kept at 15°–20 C.

Agitation was continued for 1 hour, after which the mixture was heated to 100° C for 2 hours. 20 grams of NaCl were then added and heating was continued for 20 minutes. The mixture separated when cold into two layers. The entire mixture was extracted with ethyl ether, after which the ether was driven off and the residue was distilled at 90° C at a pressure of 0.5 × 10$^{-3}$ mm of mercury.

The product obtained, when analyzed, corresponded to di-(diethyl aminomethyl) phenol.

The following substances were prepared similarly: diethylaminomethyl phenol (DEP), dimethyl aminomethyl phenol (DMP), and tri-(dimethyl aminomethyl) phenol (TDMP).

EXAMPLE 2

Preparation of a Stabilizer Derived from Saligenin 6.2 grams (1/20 mol) of saligenin (orthohydroxybenzyl alcohol) and 11.25 grams of a 40 percent aqueous solution of dimethylamine (0.1 mol) were introduced into a 250 cm$^3$ flask kept in a nitrogen atmosphere and equipped with an agitator, a condenser, a funnel and a thermometer. 10 grams of a 30 percent solution of formaldehyde (0.1 mol) were then added to the clear solution. The reaction was exothermic. The mixture was cooled with melting ice and agitated for 1 hour at 20° C and then for 1 hour at 100° C.

Two phases formed during cooling — a yellow solution and a whitish product. The product was a polymer having a molecular weight of about 500, a structure which is probably similar to the structure of phenol-formol resins and $CH_2H(CH_3)_2$ and $CH_2OH$ groups. It contained approximately two nitrogen atoms per benzene ring.

EXAMPLE 3

The Preparation of a Stabilizer Obtained by the Reaction of a Mannich Base with an Aldehyde 0.5 gram of TDMP (Example 1) and 12 cm$^3$ of an aqueous 30 percent solution of formaldehyde were introduced into a boat placed in an evaporator heated to 100° C. A very slow current of nitrogen was passed through the mixture for 2 hours. After cooling, the mixture was extracted in vacuo for 3 hours. The product which collected in the boat was taken up with methyl alcohol.

The insoluble part (polyformaldehyde) of the ethyl solution was separated by filtration. The polyformaldehyde was evaporated to dryness, giving a resinous product which was found to be a polysulphide stabilizer.

The Preparation of Poly(alkene sulphides)

Various polymers and copolymers of poly(alkene sulphides) were prepared by using comonomers and catalysts under various polymerization conditions.

EXAMPLE 4

Poly(ethylene sulphide), using Triphenyl Phosphine (PO$_3$) as a Cataylst in a Dimethyl Sulphoxide (DMSO) Medium 20 cm$^3$ of a mixture of 3 parts toluene and 1 part dimethyl sulphoxide and 2.5 cm$^3$ of a 200 mM/l solution of triphenyl phosphine in dimethyl sulphoxide were introduced into a 2-liter flask equipped with a stainless steel mechanical agitator, a reflux condenser, a funnel and various accessories for keeping the flask in a nitrogen atmosphere free from oxygen and water. 100 g of thiirane in solution in one liter of the same mixture of toluene and dimethyl sulphoxide were then gradually introduced during one hour. Polymerization started at the ambient temperature 15 minutes after the monomer was first introduced. The temperature was then kept between 35° and 40° C for 2 hours. The reaction was completed by continuing the agitation for 1½ hours. Methanol was then added, and the polymer was separated by filtration from the mixture of methanol and polymerization dispersing agents.

The polymer was then washed in water and entrained in water vapor in order to eliminate the toluene and the dimethyl sulphoxide it contained. Finally it was dried in vacuo at 80° C.

90 g of polythiirane were obtained, melting between 204° and 208° C.

The polymer has the reference number PSE 4.

EXAMPLE 5

Poly(ethylene sulphide) using Triphenyl Phosphonium Oleate in an IMSO Medium as Catalyst 100 cm$^3$ of dimethyl sulphoxide and 0.5 mM of tetraphenyl phosphonium oleate were introduced into a 2liter glass reactor equipped with a stainless steel mechanical agitator and kept in a nitrogen atmosphere, free from oxygen and water. 100 g of thiirane in solution in 1.2 liters of dimethyl sulphoxide were then gradually added. Polymerization began immediately. The monomer was added for one hour and the temperature was kept at 40° C. Agitation was continued for a further 2 hours, and the temperature was allowed to drop. The polymer was then filtered, washed in methanol, entrained with water vapor and dried in vacuo at 80° C. 96 g of polythiirane were obtained, melting between 203° and 207° C.

The polymer has the reference number PSE 5

EXAMPLE 6

Poly(ethylene sulphide) was again prepared, using a catalyst (Zn Et$_2$, H$_2$O) in a heptane medium, in the manner described in Example 1 of French Pat. No. 1,390,165. A 45 percent yield was obtained of a polymer melting at 203°–205° C.

The polymer has the reference number PSE 6.

EXAMPLE 7

Poly(ethylene sulphide), using Tetraethyl-ammonium Oxalate as Catalyst, in a Toluene Medium 40 cm$^3$ of a suspension of tetraethyl-ammonium oxalate in the proportion of 50 millimols per liter of toluene were introduced into a glass flask equipped with an agitator and with all the accessories required for keeping it in a dry nitrogen atmosphere free from oxygen, and for adding the different reagents. 20 cm$^3$ of a solution of 200 g of thiirane in one liter of toluene were added. The mixture was heated to 40° C and the reaction started after a few minutes. The rest of the monomer solution was then added during a period of 2 hours 25 minutes. Agitation at 40° C was continued for 16 hours 30 minutes. The polymer was then separated by filtration, washed in methanol and dried in vacuo at 80° C giving 70.5 g of polythiirane.

Reference number of product: PSE 7

EXAMPLE 8

Polylethylene sulphide), using an Amine Catalyst in a Toluene DMSO Medium

The same apparatus was used as in Example 5. 100 cm$^3$ of the same mixture of toluene and dimethyl sulphoxide and 2.5 millimols of N,N-dimethyl dodecylamine were introduced. 500 g of thiirane in solution in 5 liters of the same mixture of toluene and dimethyl sulphoxide were then added. Polymerization started immediately and the temperature rose to 40°–45° C and was kept at this level for 5 hours. The polymer was then washed with methanol and dried in vacuo at 80° C, giving 490 g of polythiirane melting at 205°–208° C and having a mass per unit volume of powder of 120 G/liter.

Reference number of polysulphide: PSE 8

EXAMPLE 9

Poly(propylene sulphide 13 cm$^3$ of dimethyl sulphoxide, 40 ml of toluene and 53 cm$^3$ of methyl thiirane were introduced into a 1,000 cm$^3$ flask equipped with a magnetic agitator and with the necessary accessories for keeping it in a pure, dry nitrogen atmosphere. The mixture was cooled to 0° C, and 0.25 millimol of triphenyl phosphine in solution in 1 cm$^3$ of a mixture of toluene and dimethyl sulphoxide (3/2) were introduced. The temperature was allowed to rise to the ambient temperature in one hour, when polymerization began (after the rise in temperature). During the following 4 hours, agitation became progressively more difficult and the agitator stopped working when the temperature rose to 30° C.

The mixture was left for 20 hours at the ambient temperature. 50 cm$^3$ of bromoethane in 500cm$^3$ of toluene were then added, after which the polymer was precipitated in methanol. The polymer was dried at reduced pressure and at ambient temperature, giving 35 g of poly(methyl thiirane) having an intrinsic viscosity of 1.8 dl/g(benzene at 25° C) and containing 0.07 percent phosphorus.

EXAMPLE 10

A Copolymer of Ethylene Episulphide (Thiirane) and Propylene Episulphide (Methyl Thiirane)

12.5 cm$^3$ of DMSO, 37.5 cm$^3$ of toluene and 2.5 mM of PO$_3$ (12.5 cm$^3$ of a 200 mM/l solution in toluene) were introduced into a 2-liter reactor kept in an atmosphere of pure, dry nitrogen and equipped with a mechanical agitator.

The mixture was heated to 40° C, after which 50 ml of the following mixture was added dropwise:
90 g thiirane
10 g methyl thiirane
237.5 cm$^3$ of dimethyl sulphoxide (DMSO), and
712.5 cm$^3$ of toluene The reaction started four minutes after the mixture was first added. The temperature of the bath was raised to 50° C.

All the medium had been added after 2 hours.

The mixture was left to stand, with heating, for 15 hours. The product was filtered and washed in water and subsequently in methanol. It was dried under reduced pressure in a rotating evaporator at 60° C.

80 g of polymer were obtained, the powder having an apparent density of 160 g/liter.

Melting point: 182° C.

EXAMPLE 11

12.5 cm$^3$ of DMSO, 37.5 cm$^3$ of toluene and 2.5 mM of PO$_3$ (12.5 cm$^3$ of a 200 mM/l solution in toluene) were introduced into a 1-liter reactor placed in a nitrogen atmosphere and equipped with a mechanical agitator.

The mixture was heated to 50° C, after which 50 cm$^3$ of the following mixture were added dropwise:
50 g of thiirane
50 g of methyl thiirane
237.5 cm$^3$ of DMSO, and
712.5 cm$^3$ of toluene Ten minutes after the mixture had first been added, the medium appeared to become less fluid. All the mixture had been added after 1½ hours. It was left to stand, with heating, for 18 hours. A gel formed which was emulsified by adding 500 cm$^3$ of toluene and about 200 cm$^3$ of water. The polymer was precipitated by adding the emulsion dropwise to a beaker containing 3 liters of distilled methanol and equipped with a magnetic agitator. The mixture was filtered and the product was left to stand for 48 hours in a vessel containing methanol. It was then filtered again and dried under reduced pressure in a rotating evaporator at 40° C.

87 g of product were obtained, the powder having an apparent density of 350 g/liter.

Melting point: 108° C.

EXAMPLE 12

Stabilization of the Polysulphides

Various Mannich bases were used for stabilizing the PSE 4 poly(ethylene sulphides).

Table I shows the results of tests using various Mannich bases according to the invention and PSE 4 polysulphide. The Table also gives control values, for the sake of comparison, of the stability obtained with pure PSE 4 and with stabilizers different from those according to the invention (i.e. ethylene diamine-bis-propionamide or EDA, dimethyl aminomethyl benzene and the sodium salt of TDMP).

The columns in Table I show:
The composition of the stabilizer used,
The proportion of the stabilizer in PSE 4,
The composition of the stabilizer, when required,
The stability of the PSE 4 after the stabilizer had been added, and
The initial fluidity index (I.F.) of the mixture.

The stability time (in minutes) was measured at 215° and 230° C (the figures marked with ⊕ are for tests made at 215° C). It was found that for the same product, the stability times at 215° and 230° C were substantially in the proportion of 2–3 to 1.

TABLE I

| | Percent | Phenol/ formol/ amine/ ratio | Stability (minutes) at 230° C. | Initial index of fluidity |
|---|---|---|---|---|
| Composition of Mannich base: | | | | |
| (Phenol plus formol plus dimethylamine) (DMP) | 2 | 1/1/1 | 42 mn. | 0.055 |
| (Phenol plus formol plus dimethylamine) (TDMP) | 2 | 1/3/3 | 55 mn. | 0.275 |
| Do | 2 | 1/3/3 | 136* | |
| Phenol plus formol plus monoethylamine | 2 | 1/2/2 | 18 mn. | 0.5 |
| Phenol plus formol plus diethylamine (DDEP) | 2 | 1/2/2 | 30 mn. | 0.07 |
| Bis phenol A plus formol plus dimethylamine | 2 | 1/2/2 | 17 mn. | |
| Do | 2 | 1/4/4 | 31 mn. | 0.6 |
| Bis phenol A plus formol plus diethylamine | 2 | 1/4/4 | 48 mn. | 0.07 |
| 2,2'-dihydroxydiphenylmethane plus formol plus dimethylamine | 2 | 1/2/2 | 50 mn. | |
| 4,4'-dihydroxydiphenylmethane plus formol plus dimethylamine | 2 | 1/2/2 | 23 mn. | 0.45 |
| Meta cresol plus formol plus dimethylamine | 2 | 1/2/2 | {25 mn. / 16 mn.} | }1 |
| Saligenin plus formol plus dimethylamine (stabiliser used in Example 2) | 2 | 1/1/1 | 126 mn. | |
| Hydroxy-4-benzylalcohol plus formol plus dimethylamine | 2 | 1/1/1 | 60 mn. 30 s. | 0.13 |
| Do | 2 | 1/2/2 | 39 mn. | 0.25 |
| Controls and stabilizer used for comparison: | | | | |
| PSE 4 (pure) | 0 | | 9.* | 0.065 |
| With EDA | 2.5 | | {22. / 75.*} | 0.05 / 0.05 |
| With dimethyl aminomethyl benzene | 2 | | 13.* | |
| With sodium salt of TDMP | 2 | | 32.* | |

* At 215° C.

It should be noted that the amino "stabilizers" which did not contain the phenol group (dimethyl aminomethyl benzene) and the Mannich bases in which the phenol group was blocked by a metal cation (the sodium salt of TDMP) had a stabilizing effect which was greatly inferior to that of the stabilizers according to the invention.

The stabilizers gave good results on the different polymers with which we experimented, except that the results were poor in the case of polymers obtained by using the diethyl zinc-water (PSE 6) complex as catalyst. These results are shown in Table II.

TABLE II
Stability at 215° C.* or 230° C. in minutes

| Polymers | Without stabiliser | 2% EDA | 2% TDMP | 2% of the base in Example 2 |
|---|---|---|---|---|
| Polythioethene: | | | | |
| PSE 7 | *41 | *56 | *90 | *132 |
| PSE 4 | 3 | 22 | 55 | 114 |
| PSE 6 | 9 | 24 | 7 | 9 |

EXAMPLE 13

The method used was the same as in Example 12, except that the PSE 4 polythioethene was stabilized with mixtures containing various proportions of TDMP and saligenin in solution in methanol.

The results were as follows:

TABLE III

| Concentration of stabilizers | | | |
|---|---|---|---|
| stabilizers | | | |
| Saligenin | 2% | 1% | 0% |
| TDMP | 0% | 1% | 2% |
| Stability at 230°C. in minutes | 3 | 72 | 55 |

EXAMPLE 14

The method was the same as in Example 12, except that the polymer was PSE 5 and the stabilizer in Example 3 was used. The results were as follows:

TABLE IV

| Stabilizers | Stability at 230° C. | Initial melting index | Final melting index |
|---|---|---|---|
| Not stabilised | 7 mn.* | 0.25 | |
| Plus 1.5% TDMP | 31 mn. | 0.1 | 3 |
| Plus 1.5% of stabiliser (Example 3) | 230 mn. | 0.12 | 0.3 |
| Plus 2.5% EDA | 25 mn.* | 0.15 | 1.5 |

* 215° C.

A similar, though less marked effect is obtained if the formaldehyde and TDMP are reacted directly with the polymer.

In the last-mentioned case, the powdered PSE 5 is made into a paste with a solution of TDMP in methanol, after which a large excess of concentrated aqueous formaldehyde solution with respect to the TDMP is added, and the mixture is evaporated to dryness.

The stability time measured at 230° C was 120 mn.

The formaldehyde was replaced by various aldehydes, acetaldehyde, benzaldehyde, and acrolein. The effects were good but much less marked.

EXAMPLE 15

The PSE 5 was stabilized as before by making it into a paste with an alcoholic solution of TDMP and various acrylamides, and by varying the proportions of the two stabilizers. An excess of aqueous formaldehyde solution, which has a synergetic effect on the stabilization process, was also added to the polymer paste that was being stabilized by a mixture of TDMP and acrylamide.

After evaporation to dryness, the stabilized powder was tested as before at 230° C.

The results, which are shown in Table V, show a marked synergetic effect.

TABLE V

| | Stability times | | | | |
|---|---|---|---|---|---|
| nature of stabilizer | TDMP 2% amide 0% | TDMP 1.5% amide 0.5% | TDMP 1% amide 1% | TDMP 0.5% amide 1.5% | TDMP 0% amide 2% |
| acrylamide | 31 mn | 40 mn | 51 mn | 48 mn | 6 mn |

| | | | | | |
|---|---|---|---|---|---|
| methyl acrylamide | 30 mn | 32 mn | 36 mn | 46 mn | 10 mn |
| Dimethyl acrylamide | 30 mn | 36 mn | 30 mn | 27 mn | 9 mn |
| acrylamide + 12% formaldehyde | 39 mn | 125 mn | 136 mn | 62 mn | 48 mn |
| acrylamide + 24% formaldehyde | 120 mn | 172 mn | 155 mn | 24 mn | |

EXAMPLE 16

Mannich bases, either alone or condensed with an aldehyde and associated with diisocyanates, effectively stabilize poly(alkene sulphides) obtained by anionic polymerization by any method of preparation.

For example, powdered PSE 5 polythioethene was made into a paste with an alcoholic solution of TDMP and toluene diisocyanate (TDI) in various proportions and quantities. The solvent was evaporated and the stability times in minutes were determined in the plastometer at 230° C.

The results are given in Table VI.

TABLE VI

| Total concentration of stabilizer | Proportions of TDMP—TDMP+TDI | | | | |
|---|---|---|---|---|---|
| | 100% | 75% | 50% | 25% | 0 |
| 2% | 38 mn | 75 mn | 90 mn | 76 mn | 7 mn |
| 4% | 51 mn | 68 mn | 84 mn | 56 mn | 7 mn |
| 8% | 41 mn | 73 mn | 66 mn | 47 mn | 6 mn |

EXAMPLE 17

Mannich bases, either alone or condensed with an aldehyde and associated with epoxides, effectively stabilize poly(alkene sulphides) obtained by any anionic method of preparation.

Polythioethene PSE 5 was stabilized under the same conditions as before, with mixtures of TDMP and Cardura E (the glycidic ester of versatic acid, produced by Shell).

Table VII shows the stability times obtained at 230° C.

TABLE VII

| Total concentration of stabilizer 100% | DMP/Cardura E.+TDMP | | | |
|---|---|---|---|---|
| | 75% | 50% | 25% | 0% |
| 2% 38 mn | 57 mn | 56 mn | 21 mn | 3 mn 30 s |
| 4% 51 mn | 45 mn | 56 mn | 20 mn | 3 mn |
| 8% 41 mn | 41 mn | 47 mn | 17 mn | 3 mn |

Another polythioethene, PSE 4 was stabilized with 2.0% by weight with respect to the polymer of mixtures of TDMP and various epoxides, 2,2-bis-[para-(2,3-epoxypropyloxy)-phenyl]-propane (I), para-bis-(2,3-epoxypropyloxy)-benzene (II) and bis-(2,3-epoxy-propyl)-butylamine (III).

The stability times, measured at 230° C, are shown in Table VIII.

TABLE VIII

| Diepoxide Proportions of | TDMP/epoxide+TDMP | | | | |
|---|---|---|---|---|---|
| | 100% | 75% | 50% | 25% | 0 |
| Diepoxide I | 45 mn | 58 mn | 45 mn | 17 mn | 3 mn |
| Diepoxide II | 45 mn | 57 mn | 34 mn | 24 mn | 3 mn |
| Diepoxide III | 45 mn | 50 mn | 31 mn | 27 mn | 5 mn |

EXAMPLE 18

Various polythioethenes were stabilized by associating the stabilizers in Examples 1, 2 and 3 with triphenyl phosphine. For comparison purposes, the same polymers were stabilized by associating EDA with triphenyl phosphine ($PO_3$). A few examples are given hereinafter. The stability times at 230° C are expressed in minutes.

TABLE IX

| $PO_3$ % | Without | 0.01 | 0.05 | 0.10 | 0.25 | 0.5 |
|---|---|---|---|---|---|---|
| PSE 5 + 2.5% EDA | 42 mn | 42 mn | 111 mn | 121 mn | 70 mn | 68 mn |
| PSE 5 + 2.5% TDMP | 38 mn | 42 mn | 53 mn | >200 mn | >200 mn | — |
| PSE 4 + 2.0 stab. Example 2 | 78 mn | 104 mn | — | 100 mn | — | — |

The symbol > indicates that the extrusion process terminated before the end of the stability stage was observed. The stability time is accordingly equal to the total extrusion time.

EXAMPLE 19

Polythioethene PSE 7 was stabilized by making the powder into a paste with an alcoholic solution of EDA (ethylene diamine-bis-propionamide) and an alcoholic solution of TDMP.

The stability at 230° C, expressed in minutes is:

TABLE X

| | Stability | Initial I.F. | Final I.F. |
|---|---|---|---|
| PSE 7 pure | 26 mn | 0.12 | 3.2 |
| PSE 7 + 2.5% EDA | 30 mn | 0.13 | 2.5 |
| PSE 7 + 2.0% TDMP | >1 H | 0.15 | 1.3 |
| PSE 7 + 2.0% stab.ex.3 | >83 mn | 0.2 | 0.6 |
| PSE 7 + 2.0% stab.ex.2 | >133 mn | 0.1 | 0.8 |

The symbol > indicates that the extrusion process terminated before the end of the stability stage was observed. The stability time is accordingly equal to the total extrusion time.

EXAMPLE 20

The copolymers in Examples 10 and 11 were stabilized by making the polymer powders into a paste with various stabilizers in alcoholic solution. The following table shows the stabilizers used, the proportions of stabilizer incorporated in the polymers, the stability times at 230° C, and the indices of fluidity (IF).

TABLE XI

| min. | Stability at 230°C. in | Initial I.F. | Final I.F. |
|---|---|---|---|
| PSEP 10 pure | 2 | 8 | |
| + 2.5% EDA | >230 | 0.15 | 0.25 |
| + 2.0% TDMP | >165 | 0.15 | 1.5 |
| + 2.0% stabilizer ex.2 | >300 | 0.15 | 0.15 |
| PSEP 11 pure | 1 | | |
| + 2.5% EDA | 14 | 0.65 | 3.5 |
| + 2.0% TDMP | 25 | 0.35 | 2.2 |
| + 2.0% stabilizer ex. 2 | 70 | 0.16 | 0.7 |

I claim:

1. A member of the group consisting of poly (ethylene sulphide), poly (propylene sulphide), and their copolymers, prepared by using as a catalyst a member of the group consisting of triphenyl phosphine, triphenyl phosphonium oleate, tetraethylammonium oxalate and N,N - dimethyl dodecylamine, stabilized by the addition of 0.5 to 10 percent of a Mannich base selected from the group consisting of di-(diethyl aminomethyl) phenol, diethylaminomethyl phenol, dimethyl aminomethyl phenol, tri-(dimethyl aminomethyl) phenol, the condensation products of orthohydroxybenzyl alcohol with formaldehyde and dimethyl amine, and the condensation products of tridimethyl aminomethyl phenol with formaldehyde.

2. The composition of claim 1 containing from 0.001 to 1 percent of a triaryl or trialkyl phosphine.

3. The composition of claim 1 containing 1 to 5 percent of the Mannich base.

4. The composition of claim 3 containing from 0.01 to 0.1 percent of a triaryl or trialkyl phosphine.

5. The composition of claim 1 in which the polymer is poly (ethylene sulphide).

6. The composition of claim 1 in which the polymer is poly (propylene sulphide).

7. The composition of claim 1 in which the polymer is a copolymer of ethylene sulphide and propylene sulphide.

8. The composition of claim 2 in which the polymer is poly (ethylene sulphide).

9. The composition of claim 2 in which the polymer is poly (propylene sulphide).

10. The composition of claim 2 in which the polymer is a copolymer of ethylene sulphide and propylene sulphide.

11. The composition of claim 3 in which the polymer is poly (ethylene sulphide).

12. The composition of claim 3 in which the polymer is poly (propylene sulphide).

13. The composition of claim 3 in which the polymer is a copolymer of ethylene sulphide and propylene sulphide.

14. The composition of claim 4 in which the polymer is poly (ethylene sulphide).

15. The composition of claim 4 in which the polymer is poly (propylene sulphide).

16. The composition of claim 4 in which the polymer is a copolymer of ethylene sulphide and propylene sulphide.

* * * * *